US008935377B2

(12) United States Patent
Glover et al.

(10) Patent No.: US 8,935,377 B2
(45) Date of Patent: Jan. 13, 2015

(54) DYNAMIC REGISTRATION OF LISTENER RESOURCES FOR CLOUD SERVICES

(71) Applicant: AT&T Intellectual Property I, L.P., Atlanta, GA (US)

(72) Inventors: Rene Glover, Pelham, AL (US); James Paul Fox, Homewood, AL (US); Rama Raghavan, Frisco, TX (US); Robert Marcus Wyatt, Arlington, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 136 days.

(21) Appl. No.: 13/663,109

(22) Filed: Oct. 29, 2012

(65) Prior Publication Data
US 2014/0122723 A1    May 1, 2014

(51) Int. Cl.
*G06F 15/173*    (2006.01)
(52) U.S. Cl.
USPC .......................... 709/223; 709/203; 709/217
(58) Field of Classification Search
USPC .................. 709/223, 224, 203, 206, 217, 219
See application file for complete search history.

(56) References Cited

U.S. PATENT DOCUMENTS

| | | | |
|---|---|---|---|
| 8,065,436 B2 | 11/2011 | Asthana et al. | |
| 8,504,400 B2 * | 8/2013 | Purcell et al. | 705/7.11 |
| 2010/0088698 A1 | 4/2010 | Krishnamurthy | |
| 2011/0107352 A1 | 5/2011 | Wells et al. | |
| 2011/0138050 A1 * | 6/2011 | Dawson et al. | 709/226 |
| 2011/0173108 A1 | 7/2011 | Rajasekar et al. | |
| 2011/0238458 A1 | 9/2011 | Purcell et al. | |
| 2012/0096271 A1 | 4/2012 | Ramarathinam et al. | |
| 2013/0218618 A1 * | 8/2013 | Purcell et al. | 705/7.13 |

OTHER PUBLICATIONS

Apache Deltacloud, "Load balancers," <http://deltacloud.apache.org/load-balancers.html>, accessed on Aug. 27, 2012 (3 pages).
Cloudflare, "Railgun™ origin network optimizer," <https://www.cloudflare.com/railgun>, accessed on Aug. 27, 2012 (1 page).
IBM Corporation, "Configuring the HTTP protocol listener," <http://publib.boulder.ibm.com/infocenter/dmndhelp/v6r2mx/topic/com.ibm.wpg.entadv.do>, accessed on Aug. 27, 2012 (2 pages).
Kammend et al., "Multiple Public Networks in Private Database Clouds," Oracle Corporation, May 2012 (24 pages).

* cited by examiner

*Primary Examiner* — Lashonda Jacobs
(74) *Attorney, Agent, or Firm* — Hartman & Citrin LLC

(57) ABSTRACT

Dynamic registration of listener resources for cloud services is disclosed. Example methods disclosed herein for cloud service listener registration include registering, at a registry server, information identifying listener resources for processing client requests associated with respective cloud services, the cloud services including a first cloud service. Some example methods also include providing first information to a client in response to a request to provide listener information for a first cloud service. In some such examples, the first information identifies a first listener resource registered for processing client requests associated with the first cloud service.

17 Claims, 7 Drawing Sheets

DYNAMIC REGISTRATION OF LISTENER RESOURCES FOR CLOUD SERVICES

FIELD OF THE DISCLOSURE

This disclosure relates generally to cloud computing and, more particularly, to dynamic registration of listener resources for cloud services.

BACKGROUND

In recent years, cloud-based computing has become increasingly popular as it enables computing services to be hosted at remote cloud site(s) (e.g., remote data center(s)) and delivered over a network to client devices. Hosting computing services at remote cloud sites can reduce or eliminate the need to invest in local computing resources (e.g., servers, storage, etc.) to implement such services. In some examples, a client device gains access to a cloud service by using a web browser and/or other application executing on the client device. For example, the web browser (or other client application) may send service requests over a network to the cloud service, which are received by a listener resource associated with the particular cloud service. In such examples, the listener resource monitors for service requests associated with its respective cloud service, routes the received service requests to the cloud service for processing, and returns appropriate responses to the client device.

BRIEF DESCRIPTION OF THE DRAWINGS

Wherever possible, the same reference numbers will be used throughout the drawing(s) and accompanying written description to refer to the same or like elements, components, parts, etc.

DETAILED DESCRIPTION

Figure 1:
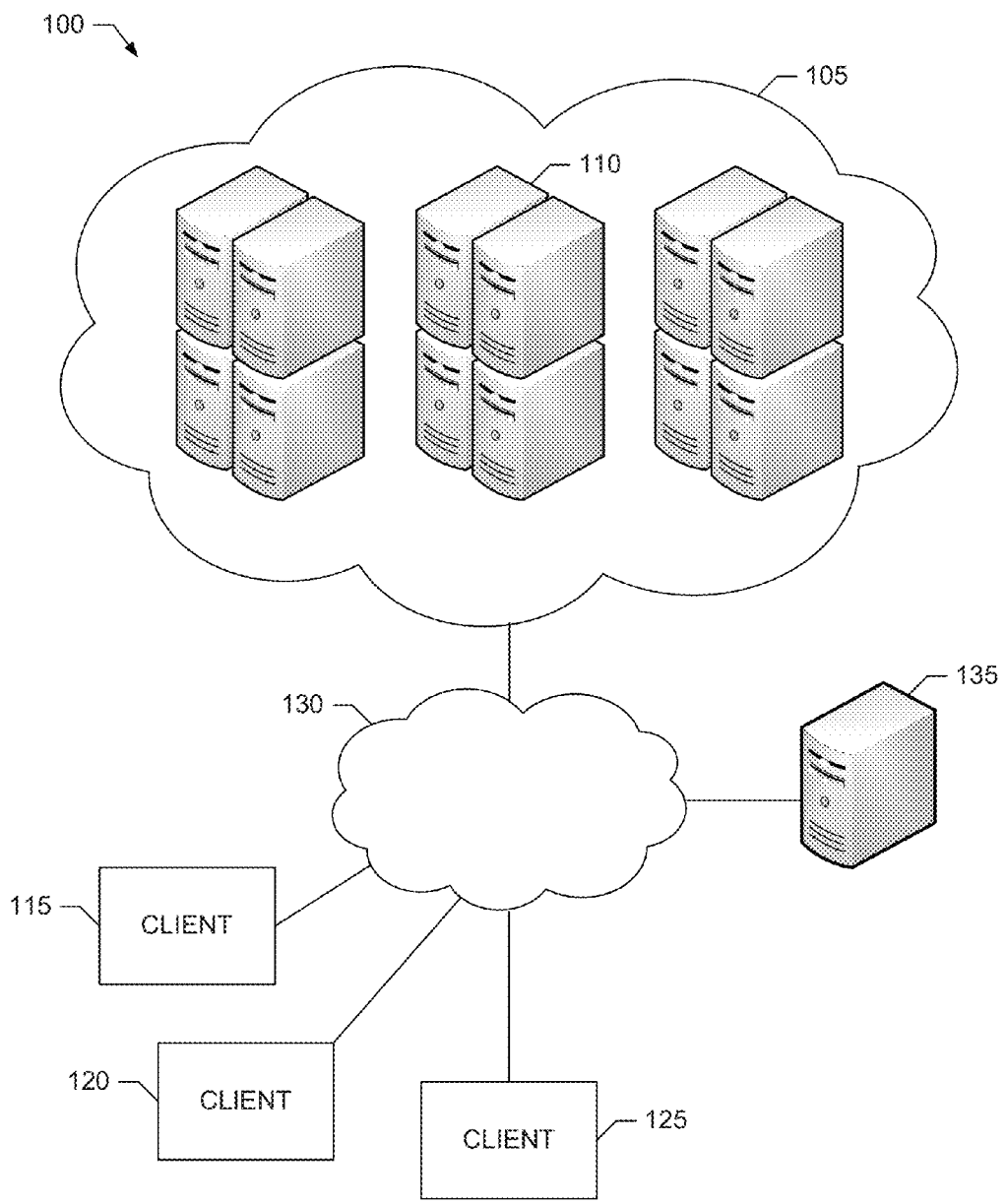
FIG. 1 is block diagram of an example cloud computing environment employing dynamic registration of listener resources for cloud services as disclosed herein.

Dynamic registration of listener resources for cloud services is disclosed herein. Disclosed example methods for cloud service listener registration include registering, at a registry server, information identifying listener resources for processing client requests associated with respective cloud services. Such example methods also include providing first information to a client in response to a request to provide listener information for a first cloud service. In such examples, the first information identifies a first listener resource registered for processing client requests associated with the first cloud service.

Some such example methods further include receiving, at the registry server, identification information identifying the first listener resource. For example, the identification information can include, but is not limited to, a name of the first cloud service, first address information identifying a host device implementing the first listener resource, and second address information identifying a port of the host device, the port being associated with the first listener resource. Such example methods also include storing the identification information to register the first listener resource as being associated with the first cloud service.

Additionally or alternatively, some such example methods further include receiving, at the registry server, identification information identifying a second listener resource for processing client requests associated with the first cloud service, with the second listener resource being different from the first listener resource. Such example methods also include registering the second listener resource as being associated with the first cloud service. Such example methods can further include deregistering the first listener resource from being associated with the first cloud service.

In some examples, the request is received at the registry server from the client, and the request corresponds to a message including a name of the first cloud service. In some examples, the first listener resource is implemented by a second server different from the registry server, and the second server also implements the first cloud service.

In some examples, the first information provided to the client identifies multiple listener resources (e.g., including the first listener resource) registered for processing client requests associated with the first cloud service. In some such examples, the multiple listener resources are implemented by multiple servers, with at least one of the servers being different from the registry server.

Further example methods, apparatus and articles of manufacture (e.g., storage media) to implement dynamic registration of listener resources for cloud services are disclosed herein.

As mentioned above, listener resources (also referred to as listeners) monitor for service requests associated with respective cloud services, route the received service requests to the respective cloud services for processing, and return appropriate responses to client devices (or, more generally, clients).

For example, a listener may be a web server, a daemon process executing on a server, etc., that is configured to receive and route service requests from clients (also referred to herein as client requests) to a particular cloud service with which the listener is associated. In many cloud computing environments, cloud services are accessed over a network using, for example, the hypertext transport protocol (HTTP), and their associated listeners are configured to execute behind hardware load balancers that provide load balancing and failover capabilities. Due to the complexities of such configurations, cloud services, or at least the listeners for such services, have been allocated statically (e.g., using static transmission control protocol (TCP) ports on the servers implementing the listeners) in prior cloud computing environments so that the configuration of the services/listeners relative to the load balancers did not change (or changed relatively infrequently).

In contrast, dynamic registration of listener resources for cloud services, as disclosed herein, supports the dynamic allocation of listener resources and the dissemination of identification information for dynamically allocated listener resources, which can reduce or eliminate the need to rely on the static allocation of such resources as in prior cloud computing environments. For example, an HTTP listener can be dynamically allocated to any available port on a host that is to execute a respective cloud service in a SOA cloud platform. Then, using dynamic registration of listener resources as disclosed herein, the listener is registered with a registry server, or some other repository, that is accessible by HTTP clients that may wish to access the cloud service. The registry server advertises listener information for its registered listeners, which may be used by a client to access a particular cloud service, perform load balancing using a group of listeners that have been dynamically allocated and registered for a particular service, etc. For example, dynamic registration of listener resources as disclosed herein enables multiple listeners to be allocated and registered for a single cloud service, and the list of listeners registered for a particular cloud service can change dynamically over time as new listeners are registered and/or existing listeners are deregistered.

As such, dynamic registration of listener resources for cloud services, as disclosed herein, works well with today's SOA cloud computing environments. For example, in at least some instances, dynamic registration of listener resources provides benefits such as: allowing listener resources (and their associated cloud services) to be added/removed dynamically to provide capacity on-demand, allowing clients to react to dynamic changes to the cloud topology, allowing clients to perform load balancing across multiple listeners that are dynamically allocated and registered for a particular cloud service (e.g., without intermediate load balancing hardware), etc. In some examples, dynamic registration of listener resources for cloud services, as disclosed herein, can reduce the need for port conflict management on cloud platform computing nodes (e.g., servers) as listeners can simply be allocated to a next available port.

With the foregoing in mind, a block diagram of an example cloud computing environment 100 supporting dynamic registration of listener resources for cloud services, as disclosed herein, is illustrated in FIG. 1. The cloud computing environment 100 of the illustrated example includes an example cloud site 105 having cloud servers, such as the example cloud server 110, to provide one or more cloud computing services (also referred to as cloud services) to its users. For example, the cloud site 105 can correspond to a data center, and the cloud server 110 can correspond to any type of data server, application server, computing node, etc., such as the example processing platform 900 illustrated in FIG. 9 and described in greater detail below, which is capable of implementing a cloud service to be provided by the cloud site 105. Examples of cloud services capable of being provided by the cloud server 110 of the cloud site 105 include, but are not limited to, a data backup/archive service, an online shopping service, a streaming media service, a word processing and/or other business application service, etc.

In the example cloud computing environment 100 of FIG. 1, the cloud services provided by the cloud site 105 are accessed by example clients 115-125 via an example network 130, such as the Internet and/or any other type(s) and number of data communication networks. In the illustrated example of FIG. 1, the clients 115-125 can correspond to, for example, any type(s) and/or number of client devices and/or client application(s) executing on one or more client devices. For example, one or more of the clients 115-125 can each correspond to a personal computer, a notebook computer, a tablet computer, a smartphone, a mobile phone, a personal digital assistant (PDA), a server, a router, a gateway, etc., and/or any other kind of client device, such as the example processing platform 900 illustrated in FIG. 9 and described in greater detail below, capable of accessing and using cloud services offered by the cloud site 105. Additionally or alternatively, one or more of the clients 115-125 can each correspond to an application executing on such a client device, such as, but not limited to, a web browser, a media handler, an app, etc., or any other kind of client application capable of accessing and using cloud services offered by the cloud site 105.

In the illustrated example, a client, such as the client 115, accesses a cloud service by sending service request(s), such as in the form of HTTP request(s), to a listener resource associated with the particular cloud service. The listener resource (also referred to as a listener) is responsible for monitoring and receiving service requests from clients (also referred to as client request) for its associated cloud resource, routing the received service requests to the cloud server 110 implementing the service for subsequent processing, and returning the resulting responses, such as in the form of HTTP responses. A listener resource can be implemented by a web server, a daemon process executing on a cloud server, such as the cloud server 110, etc., and/or by any other resource configured to monitor for, receive and route service requests for its respective cloud service. Also, in the illustrated example, a listener resource for a particular cloud service can be implemented by (e.g., executed on) the same cloud server (e.g., the clouds server 110) implementing the cloud service, or by a different cloud server than the cloud server implementing the service (e.g., such as when the listener resource is acting as a broker of the cloud service). Moreover, more than one listener can be implemented and associated with a particular cloud service, with the listeners for the cloud service being implemented by the same cloud server, by different cloud servers, or by combination(s) thereof (e.g., to permit, for example, load balancing, failover functionality, etc.).

To support dynamic allocation of listener resources for cloud services provided by the cloud site 105 and/or other cloud sites (not shown), the example cloud computing environment 100 further includes an example registry server 135. The registry server 135 can be implemented by any type of server, computer, processor, etc., such as the example processing platform 900 illustrated in FIG. 9 and described in greater detail below. The registry server 135 of the illustrated example receives identification information for listener resources allocated at the cloud site 105, and uses the received identification information to register the listeners as being associated with their respective cloud services. For example, the identification information for a listener resource, and its association with a respective cloud service, can be received at the registry server 135 from the cloud server 110 hosting the listener resource, or from the cloud server 110 hosting the cloud service for which the listener resource was allocated. The cloud service associated with a listener can be identified (e.g., specified) in the received listener identification information, or determined based on the source of the listener identification information (e.g., such as when the listener information is provided by the cloud server implementing the cloud service associated with the listener). In some examples, the registry server 135 also updates the set(s) of listeners registered as being available to process service request for respective cloud service(s) based on subsequent listener identification information received at the registry server 135, validity durations specified for the listener(s) registered at the registry server 135, etc. In the illustrated example, the registry server 135 organizes the registered listeners by service name so that a set (e.g., group, list, etc.) of listeners associated with a particular cloud service can be readily determined.

The registry server 135 of the illustrated example also advertises listener information to the clients 115-125. For example, the registry server 135 can advertise listener information by receiving (e.g., from a client) a request to provide listener information for a particular cloud service, and then responding (e.g., to the client) with information specifying the listener(s) registered as being available to process service requests for the particular cloud service identified in the received request. In the illustrated example, a client, such as the client 115, uses the listener information provided by the registry server 135 to determine the listener to which the service request(s) for particular cloud service is (are) to be sent. For example, if multiple listeners are identified in the listener information provided to the client 115 for a particular service, the client 115 can perform load balancing, round-robin selection, random selection, etc., to select one of the listeners to which the service request(s) for particular cloud service is (are) to be sent.

Although one cloud site 105, three cloud servers 110, three clients 115-125, one network 130 and one registry server 135 are illustrated in the example of FIG. 1, dynamic registration of listener resources for cloud services (also referred to as dynamic listener registration) can be employed in a cloud computing environment 100 having any number of cloud sites 105, cloud servers 110, clients 115-125, networks 130 and registry servers 135. Furthermore, in the example of FIG. 1, the registry server 135 is illustrated as being implemented separately from the cloud site 105 and the cloud servers 110. Such an example can support an implementation in which the registry server 135 implements a dynamic listener registration service for multiple different cloud sites 105, possibly across multiple different cloud service providers. In other examples, the registry server 135 may be implemented by a cloud server at the cloud site 105 and, thus, may provide a dynamic listener registration service for only those cloud services provided by the cloud site 105.

Figure 2:
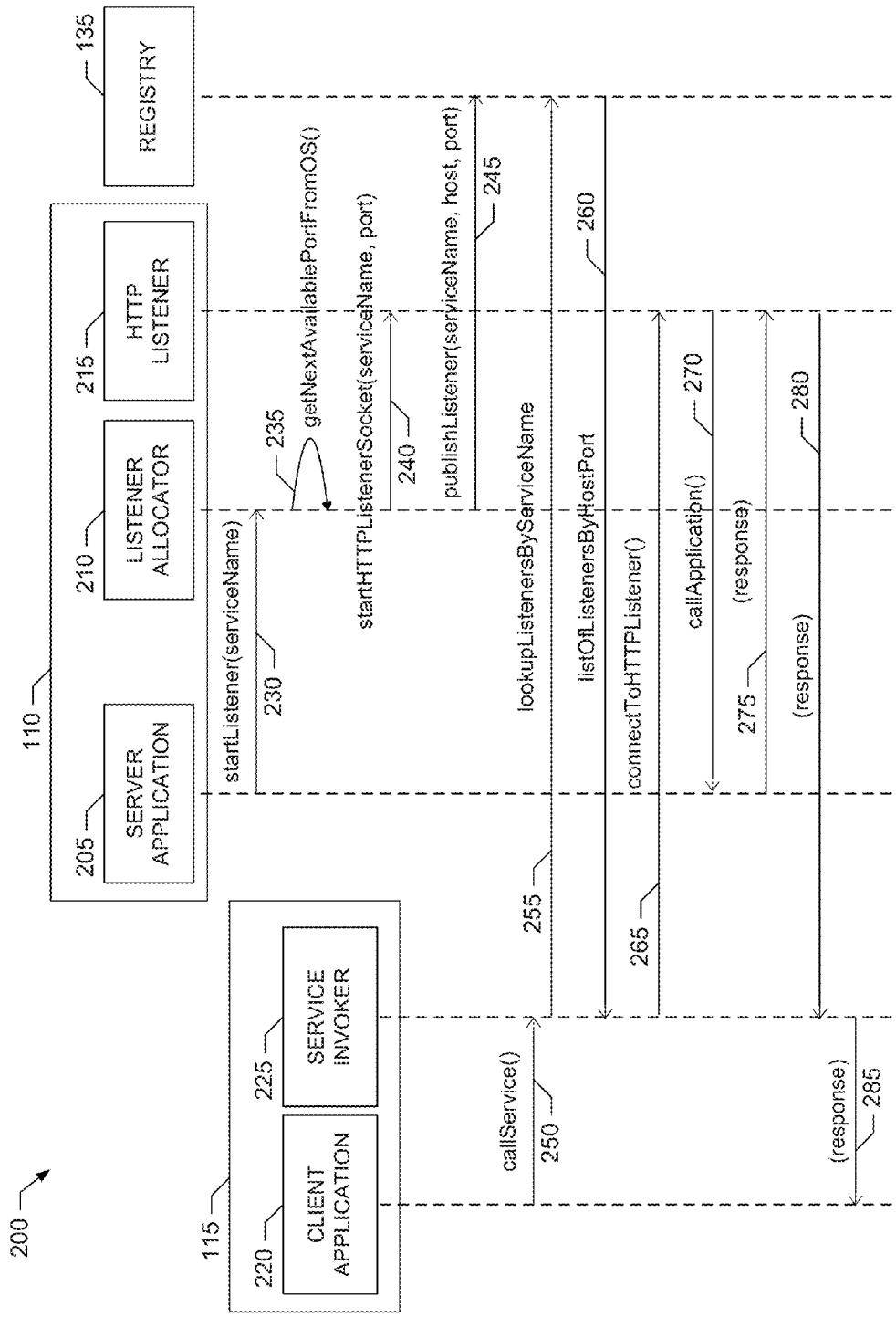
FIG. 2 is a message sequence diagram illustrating example messages exchanged between an example cloud server hosting an example listener resource, an example registry server and an example client in the example cloud computing environment of FIG. 1 to implement dynamic registration of listener resources for cloud services as disclosed herein.

An example message sequence diagram 200 illustrating example messages exchanged between, for example, the cloud server 110, the registry server 135 and the client 115 to implement dynamic registration of listener resources for cloud services is illustrated in FIG. 2. Example implementations of the cloud server 110 and the client 115 to support dynamic listener registration are also illustrated in FIG. 2. In the illustrated example, the cloud server 110 of FIG. 2 includes an example server application 205 that is to implement a cloud service. The server application 205 of the illustrated example also invokes an example listener allocator 210 to allocate example listener(s) 215 for processing service requests for the cloud service. The implementation and operation of the cloud server 110, the server application 205, the listener allocator 210 and the listener 215 are described in the context of the message sequence diagram 200 and other flowcharts discussed in greater detail below.

The client 115 in the illustrated example of FIG. 2 includes an example client application 220 that is to access and use the cloud service provided by the server application 205. To access the cloud service, the client 115 of the illustrated example also includes an example service invoker 225 that is to determine the listener to which service requests for the cloud service are to be sent. The implementation and operation of the client 115, the client application 220 and the service invoker 225 are described in the context of the message sequence diagram 200 and other flowcharts discussed in greater detail below.

In the message sequence diagram 200 of the illustrated example, the cloud server 110 is assumed to be implementing (e.g., hosting) the listener 215. As such, the cloud server 110 is to provide (e.g., publish) listener identification information to the registry server 135, which is to register the identified listener as being associated with the identified cloud service implemented by the server application 205. The client 115 is to then request listener information for the cloud service implemented by the server application 205, which is to be used to select the listener 215 as the listener to which service request(s) for the client service (is) are to be sent.

With the foregoing in mind, the message sequence diagram 200 begins with the server application 205 sending an example startListener message 230 to the listener allocator 210. The startListener message 230 identifies the service name of the particular cloud service for which a listener resource (e.g., the listener 215) is to be allocated and started. In response to the startListener message 230, the listener allocator 210 invokes an example getNextAvailablePortFromOS process 235, which queries the network stack of the cloud server's operating system for an available port (e.g., the next available port) on the cloud server 110. The listener allocator 210 then invokes an example startHTTPListenerSocket process 240, which allocates the listener 215 to the port returned by the process 235 and starts the listener 215 for processing service requests associated with the identified cloud service. The listener allocator 210 also sends an example publishListener message 245 to the registry server 135 to publish the listener 215 as being available for processing service requests for the cloud service identified in the message 245. In the illustrated example, the publishListener message 245 includes the name of the cloud service, address information identifying the host device (e.g., the cloud server 110) implementing the listener 215, and the port of the host device that has been allocated for use in communicating with the listener 215. As described above, the registry server 135 uses the identification information included in the publishListener message 245 to register the listener 215 as being included in the set of listeners available for processing service requests for the identified cloud service implemented by the service application 205. For example, the registry server 135 can advertise the availability of the listener 215, and its host and port identification information, for the cloud service name provided by cloud server 110 in the publishListener message 245.

Next, the client application 220 of the client 115 makes an example call 250 to the cloud service implemented by the server application 205. The call 250 includes the name of the cloud service. In response to the call 250, the service invoker 225 of the client 115 connects to the registry server 135 and sends an example lookupListenerByServiceName request 255 to the registry server 135 to perform a lookup of available listeners associated with the specified name of the cloud service called by the client application 220. In response to the request, the registry server 135 provides an example listOfListenersByHostPort response 260 to the client 115 that includes a list of the listeners registered as being associated with the service name included in the request 255. In the illustrated example, the list of listeners provided in the response 260 includes information identifying the listener 215 due to its prior registration with the registry server 135. As noted above, the listeners identified in the response 260 provided by the registry server 135 may be hosted by the same or different host servers, and may have been registered by the registry server 135 based on listener information received at different times. As such, in some examples, the list of listeners provided in the response 260 may be dynamic and, thus, may vary over time to identify only those listeners that are currently allocated to a specified cloud service identified in a lookupListenerByServiceName request 255.

In the illustrated example, the service invoker 225 processes the list of listeners returned by the registry server 135 in the response 260 and selects the listener 215 for processing service requests for the particular cloud service. The service invoker 225 can employ any appropriate technique to perform its selection (e.g., such as load balancing, random selection, round robin selection, etc.). The service invoker 225 then sends an example connectToHTTPListener message 265 to connect to the listener 215 and provide the service request for the particular cloud service. The listener 215 receives the service request and uses an example callApplication process 270 to invoke the cloud service and route the service request to the cloud service for processing. Later, the listener 215 receives an example response 275 from the cloud service, which is returned in example responses 280 and 285 to the client application.

Figure 3:
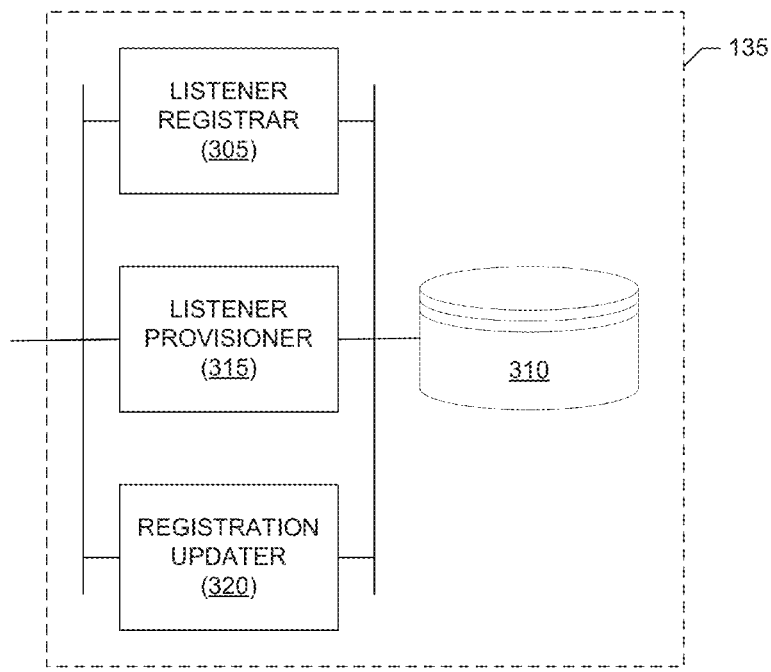
FIG. 3 is a block diagram of an example registry server that may be used in the example cloud computing environment of FIG. 1.

A block diagram of an example implementation of the registry server 135 of FIGS. 1-2 is illustrated in FIG. 3. The example registry server 135 of FIG. 3 includes an example listener registrar 305 to receive identification information for listener resources (listeners) that are to be registered as being available for processing service requests for respective cloud services. For example, the identification information for a particular listener resource can include, but is not limited to, information identifying the host device (e.g., the cloud server 110) implementing the listener, information identifying the port of the host device that has been allocated for use in communicating with the listener, etc. The listener's identification information may also include the name of the cloud service for which the listener is to be registered, and/or such information may be ascertained based on the source providing (e.g., publishing) the listener's identification information to the registry server 135.

The listener registrar 305 of the illustrated example stores the identification information received for a listener in an example listener repository 310. The listener repository 310 can be implemented by any type of memory or storage device, such as the mass storage device 930 and/or the volatile memory 918 of the example processing system 900 of FIG. 9, which is described in greater detail below. In the illustrated example, the listener registrar 305 organizes the identification information for registered listeners according to the name(s) of the cloud service(s) with which they are associated. For example, the listener registrar 305 can use any appropriate data format and arrangement (e.g., such as a database, linked list, etc.) to link registered listener identification information (e.g., such as host and port information) with the name of the cloud service for which the respective listener is to be registered as being available for processing service requests. By organizing the registered listener identification information according service name, the registry server 135 can provide a set of available listeners (e.g., in the form of a list) for a particular cloud service in response to a request from a client (e.g., such as the client 115).

The example registry server 135 of FIG. 3 also includes an example listener provisioner 315 to provide listener information to requesting clients. In the illustrated example, the listener provisioner 315 can receive a request, from a client (e.g., such as the client 115), to provide listener information for a cloud service identified in the request. Then, in response to the request, the listener provisioner 315 provides (e.g., advertises) a response including information identifying a listener resource, or a set of listener resources, registered as being available to process service requests for the cloud service identifies in the received request. For example, the listener provisioner 315 can process the registered listener information, which is stored in the listener repository 310 according to service name, to determine a list of registered listeners for the service name identified in the request received from the client. The listener provisioner 315 can then provide this list of registered listeners, which includes address information (e.g., host name and port number) identifying the listener(s) in the list, to the client requesting the listener information for the identified cloud service.

The example registry server 135 of FIG. 3 further includes an example registration updater 320 to update the registered listener information 320 stored in the listener repository 310 based on, for example, one or more update criteria. For example, the registration updater 320 can deregister a listener resource that is registered for a cloud service after a registration duration has expired (e.g., which may be specified in a configuration parameter, specified in the listener identification information received by the listener registrar 305, etc.). Additionally or alternatively, the registration updater 320 can deregister a listener resource that is registered for a cloud service when a maximum number of listeners allowed to be registered for a particular cloud service has been reached (e.g., which may be specified as a configuration parameter, etc.). For example, assume that a first listener resource has been registered as being associated with a particular cloud service. Sometime later, the listener registrar 305 may receive identification information for a second listener, different from the first listener, which is to be registered as being associated with the same cloud service. In such an example, the listener registrar 305 may store the second listener's identification information in the listener repository 310 to thereby register the second listener as being associated with the particular cloud service. Additionally, the registration update 320 may deregister the first listener from being associated with the cloud server (e.g., by deleting the first listener's identification information from the listener repository 310). Such deregistering may occur, for example, after expiration of a registration duration, after a maximum number of listeners allowed to be registered for the particular cloud service has been exceeded, etc.

While example manners of implementing the cloud computing environment 100 of FIG. 1 has been illustrated in FIGS. 1-3, one or more of the elements, processes and/or devices illustrated in FIGS. 1-3 may be combined, divided, re-arranged, omitted, eliminated and/or implemented in any other way. Further, the example cloud site 105, the example cloud server(s) 110, the example clients 115-125, the example network 130, the example registry server 135, the example server application 205, the example listener allocator 210, the example listener 215, the example client application 220, the example service invoker 225, the example listener registrar 305, the example listener repository 310, the example listener provisioner 315, the example registration updater 320 and/or, more generally, the example cloud computing environment 100 of FIGS. 1-3 may be implemented by hardware, software, firmware and/or any combination of hardware, software and/or firmware. Thus, for example, any of the example cloud site 105, the example cloud server(s) 110, the example clients 115-125, the example network 130, the example registry server 135, the example server application 205, the example listener allocator 210, the example listener 215, the example client application 220, the example service invoker 225, the example listener registrar 305, the example listener repository 310, the example listener provisioner 315, the example registration updater 320 and/or, more generally, the example cloud computing environment 100 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the apparatus or system claims of this patent are read to cover a purely software and/or firmware implementation, at least one of the example cloud computing environment 100, the example cloud site 105, the example cloud server(s) 110, the example clients 115-125, the example network 130, the example registry server 135, the example server application 205, the example listener allocator 210, the example listener 215, the example client application 220, the example service invoker 225, the example listener registrar 305, the example listener repository 310, the example listener provisioner 315 and/or the example registration updater 320 are hereby expressly defined to include a tangible computer readable medium such as a memory, digital versatile disk (DVD), compact disk (CD), Blu-ray disc™, etc., storing such software and/or firmware. Further still, the example cloud computing environment 100, the example cloud server(s) 110, the example client 115 and/or the example registry server 135 of FIGS. 1-3 may include one or more elements, processes and/or devices in addition to, or instead of, those illustrated in FIGS. 1-3, and/or may include more than one of any or all of the illustrated elements, processes and devices.

Flowcharts representative of example machine readable instructions for implementing the example cloud computing environment 100, the example cloud site 105, the example cloud server(s) 110, the example clients 115-125, the example network 130, the example registry server 135, the example server application 205, the example listener allocator 210, the example listener 215, the example client application 220, the example service invoker 225, the example listener registrar 305, the example listener repository 310, the example listener provisioner 315 and/or the example registration updater 320 are shown in FIGS. 4-8. In these examples, the machine readable instructions represented by each flowchart may comprise one or more programs for execution by a processor, such as the processor 912 shown in the example processing system 900 discussed below in connection with FIG. 9. The one or more programs, or portion(s) thereof, may be embodied in software stored on a tangible computer readable medium such as a CD-ROM, a floppy disk, a hard drive, a digital versatile disk (DVD), a Blu-ray disc™, or a memory associated with the processor 912, but the entire program or programs and/or portions thereof could alternatively be executed by a device other than the processor 912 (e.g., such as a controller and/or any other suitable device) and/or embodied in firmware or dedicated hardware (e.g., implemented by an ASIC, a PLD, an FPLD, discrete logic, etc.). Also, one or more of the machine readable instructions represented by the flowchart of FIGS. 4-8 may be implemented manually. Further, although the example machine readable instructions are described with reference to the flowcharts illustrated in FIGS. 4-8, many other methods of implementing the example cloud computing environment 100, the example cloud site 105, the example cloud server(s) 110, the example clients 115-125, the example network 130, the example registry server 135, the example server application 205, the example listener allocator 210, the example listener 215, the example client application 220, the example service invoker 225, the example listener registrar 305, the example listener repository 310, the example listener provisioner 315 and/or the example registration updater 320 may alternatively be used. For example, with reference to the flowcharts illustrated in FIGS. 4-8, the order of execution of the blocks may be changed, and/or some of the blocks described may be changed, eliminated, combined and/or subdivided into multiple blocks.

As mentioned above, the example processes of FIGS. 4-8 may be implemented using coded instructions (e.g., computer readable instructions) stored on a tangible computer readable medium such as a hard disk drive, a flash memory, a read-only memory (ROM), a CD, a DVD, a cache, a random-access memory (RAM) and/or any other storage media in which information is stored for any duration (e.g., for extended time periods, permanently, brief instances, for temporarily buffering, and/or for caching of the information). As used herein, the term "tangible computer readable medium" is expressly defined to include any type of computer readable storage and to exclude propagating signals. Additionally or alternatively, the example processes of FIGS. 4-8 may be implemented using coded instructions (e.g., computer readable instructions) stored on a non-transitory computer readable medium, such as a flash memory, a ROM, a CD, a DVD, a cache, a random-access memory (RAM) and/or any other storage media in which information is stored for any duration (e.g., for extended time periods, permanently, brief instances, for temporarily buffering, and/or for caching of the information). As used herein, the term "non-transitory computer readable medium" is expressly defined to include any type of computer readable medium and to exclude propagating signals. Also, as used herein, the terms "computer readable" and "machine readable" are considered equivalent unless indicated otherwise. Furthermore, as used herein, when the phrase "at least" is used as the transition term in a preamble of a claim, it is open-ended in the same manner as the term "comprising" is open ended. Thus, a claim using "at least" as the transition term in its preamble may include elements in addition to those expressly recited in the claim.

Figure 4:
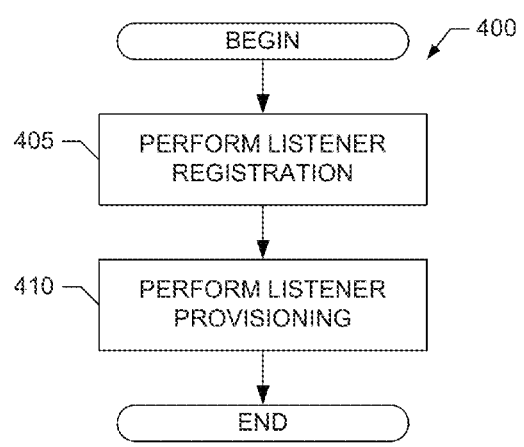
FIG. 4 is a flowchart representative of example machine readable instructions that may be executed to implement dynamic registration of listener resources for cloud services in the example cloud computing environment of FIG. 1.

Example machine readable instructions 400 that may be executed to implement the dynamic registration of listener resources in the example cloud computing environment 100 of FIG. 1 are represented by the flowchart shown in FIG. 4. For convenience, and without loss of generality, execution of the machine readable instructions 400 is described in the context of an example implementation involving the cloud server 110, the client 115 and the registry server 135 as illustrated in FIG. 2. With reference to the preceding figures and associated descriptions, the machine readable instructions 400 of FIG. 4 begin execution at block 405 at which an example listener registration procedure is performed by the cloud server 110 and the registry server 135 of the cloud computing environment 100 to register a listener resource as being available to process service requests for a specified cloud service. For example, the processing at block 405 can correspond to some or all of the elements 230-245 of FIG. 2. Returning to FIG. 4, at block 410, an example listener provisioning procedure is performed by the client 115 and the registry server 135 of the cloud computing environment 100 to provide listener information for a specified cloud service to the requesting client 115. For example, the processing at block 410 can correspond to some or all of the elements 250-265 of FIG. 2.

Figure 5:
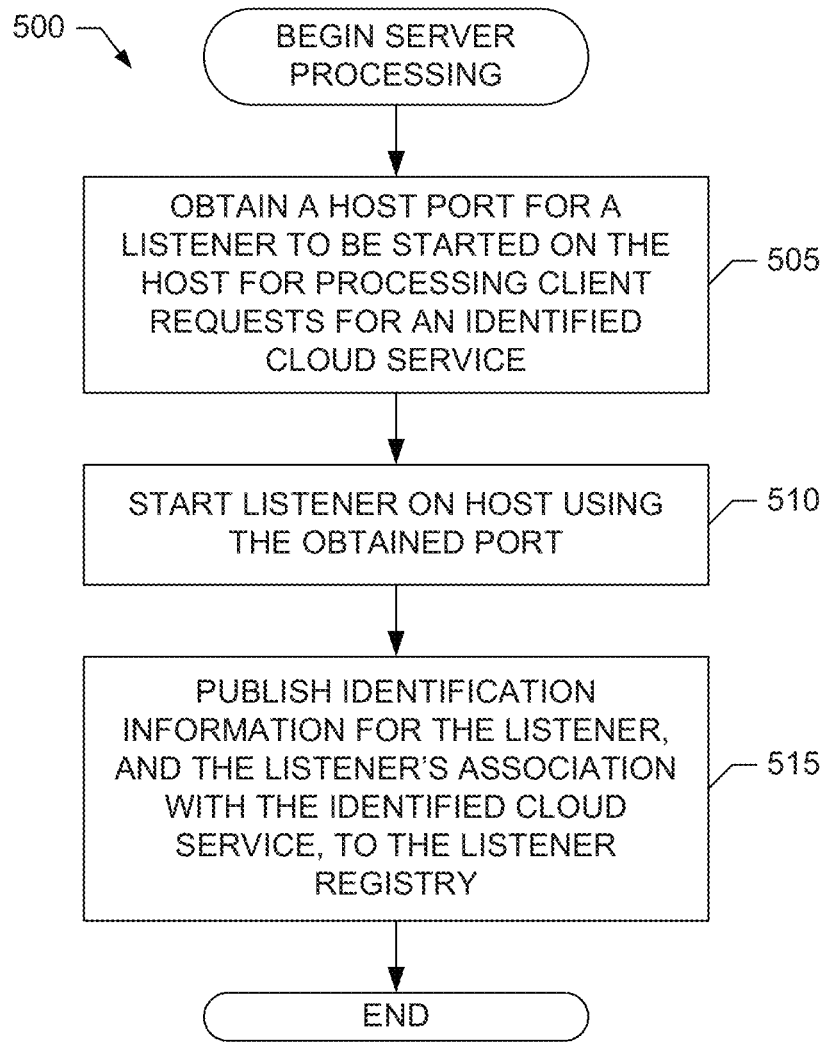
FIG. 5 is a flowchart representative of example machine readable instructions that may be executed by the example cloud server of FIGS. 1 and/or 2 to implement dynamic registration of listener resources for cloud services as disclosed herein.

Example machine readable instructions 500 that may be executed to implement dynamic listener registration functionality in the example cloud server 110 of FIGS. 1-2 are represented by the flowchart shown in FIG. 5. For convenience, and without loss of generality, execution of the machine readable instructions 500 is described in the context of the cloud server 110 operating as illustrated in the example of FIG. 2. With reference to the preceding figures and associated descriptions, the machine readable instructions 500 of FIG. 5 begin execution at block 505 at which the listener allocator 210 of the cloud server 110 obtains, as described above, a host port for the listener 215, which is to be started for processing service requests associated with a particular cloud service implemented by the server application 205. At block 510, the listener allocator 210 starts the listener 215 on the cloud server 110 and allocates the port number obtained at block 505 for communications exchanged with the listener 215, as described above. At block 515, the listener allocator 210 publishes identification information for the listener 215, and the listener's association with the particular cloud service, to the registry server 135, as described above.

Figure 6:
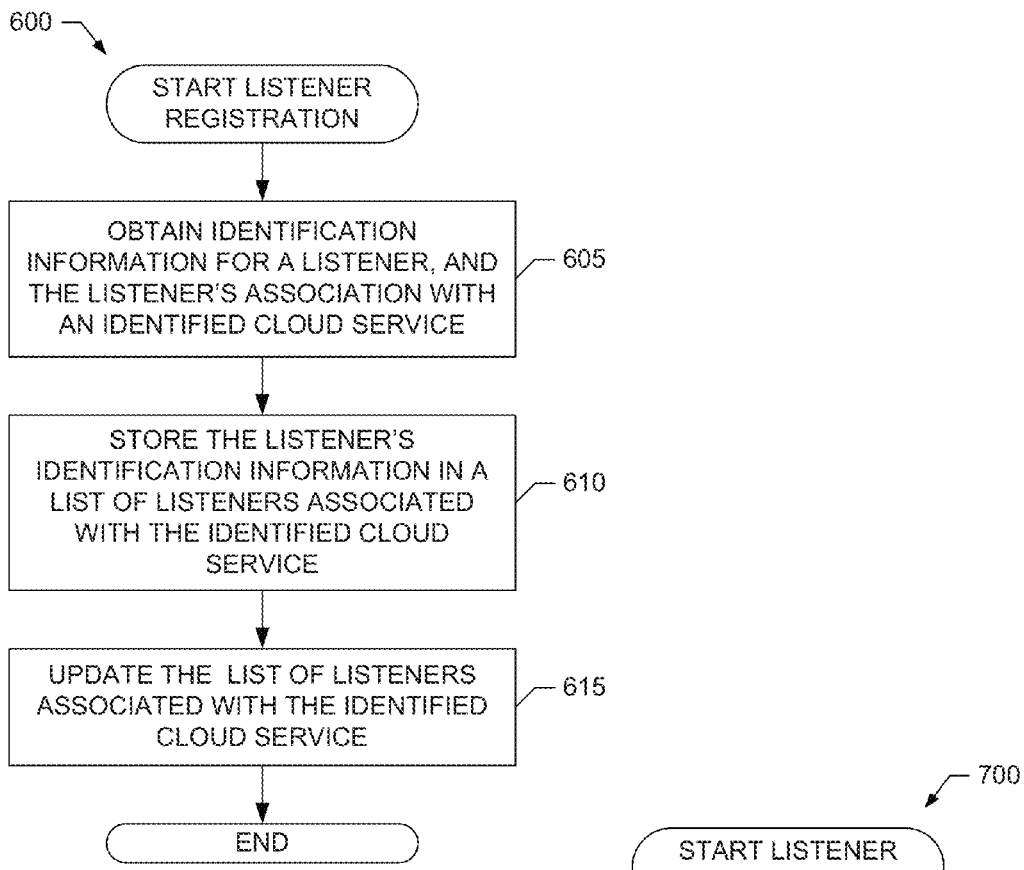
FIG. 6 is a flowchart representative of first example machine readable instructions that may be executed by the example registry server of FIGS. 1, 2 and/or 3 to implement dynamic registration of listener resources for cloud services as disclosed herein.

First example machine readable instructions 600 that may be executed to implement dynamic listener registration functionality in the example registry server 135 of FIGS. 1-3 are represented by the flowchart shown in FIG. 6. For convenience, and without loss of generality, execution of the machine readable instructions 600 is described in the context of the registry server 135 operating as illustrated in the example of FIG. 2. With reference to the preceding figures and associated descriptions, the machine readable instructions 600 of FIG. 6 begin execution at block 605 at which listener registrar 305 of the registry server 135 obtains, as described above, identification information for a listener to be registered as being associated with a cloud service identified in and/or otherwise determined from the received identification information. At block 610, the listener registrar 305 stores the listener's identification in the listener repository 310 of the registry server 135 by, for example, including the listener's identification information with a set (e.g., list) of listeners registered as being available to process service requests for the identified cloud service, as described above. At block 615, the registration updater 320 of the registry server 135 updates the set (e.g., list) of listeners associated with the identified cloud service based on, for example, one or more update criteria, as described above.

Figure 7:
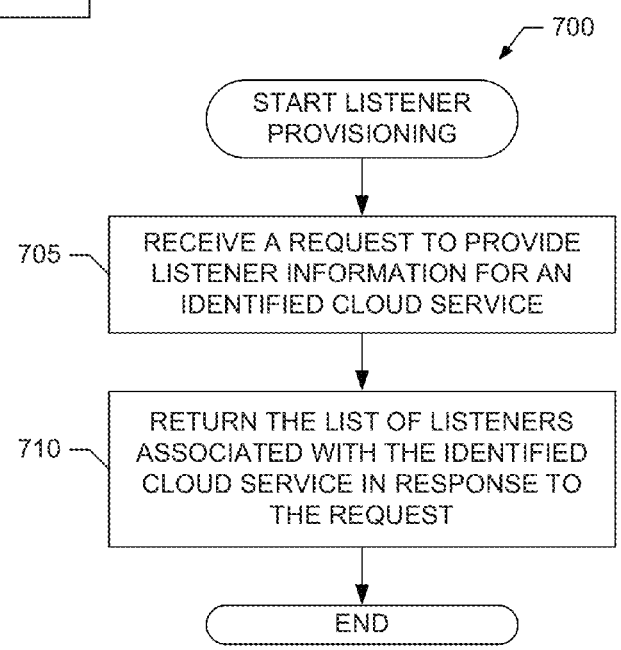
FIG. 7 is a flowchart representative of second example machine readable instructions that may be executed by the example registry server of FIGS. 1, 2 and/or 3 to implement dynamic registration of listener resources for cloud services as disclosed herein.

Second example machine readable instructions 700 that may be executed to implement dynamic listener registration functionality in the example registry server 135 of FIGS. 1-3 are represented by the flowchart shown in FIG. 7. For convenience, and without loss of generality, execution of the machine readable instructions 700 is described in the context of the registry server 135 operating as illustrated in the example of FIG. 2. With reference to the preceding figures and associated descriptions, the machine readable instructions 700 of FIG. 7 begin execution at block 705 at which listener provisioner 315 of the registry server 135 receives a request from a client (e.g., the client 115) to provide listener information for a cloud service identified in the request, as described above. At block 710, the listener provisioner 315 returns the requested listener information to the client, as described above. For example, the listener information provided to the client at block 710 can include address information identifying one or more listeners, such as the listener 215, which have been registered as being available for processing service requests associated with cloud service identified in the request received at block 705.

Figure 8:
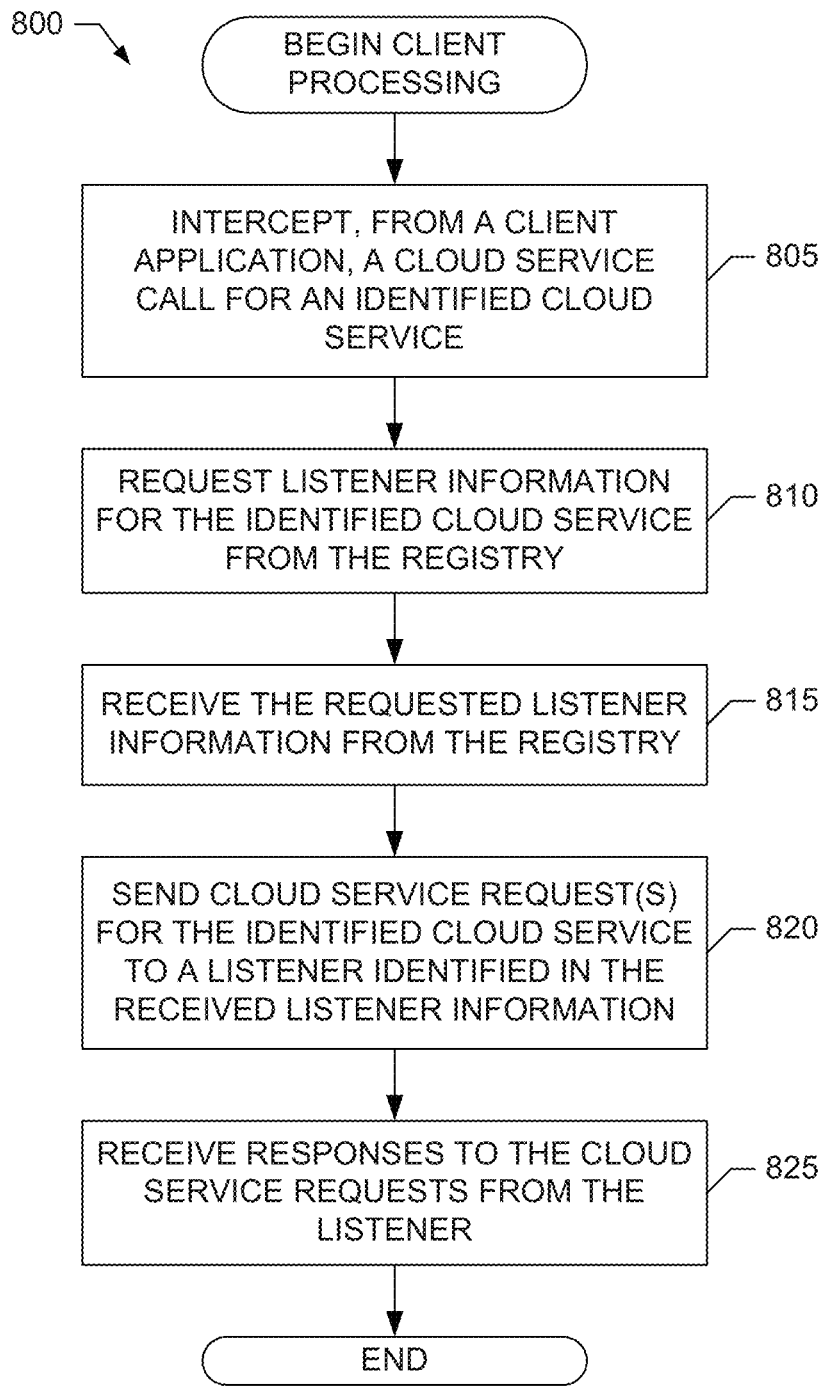
FIG. 8 is a flowchart representative of example machine readable instructions that may be executed by the example client of FIGS. 1 and/or 2 to implement dynamic registration of listener resources for cloud services as disclosed herein.

Example machine readable instructions 800 that may be executed to implement dynamic listener registration functionality in the example client 115 of FIGS. 1-2 are represented by the flowchart shown in FIG. 8. For convenience, and without loss of generality, execution of the machine readable instructions 800 is described in the context of the client 115 operating as illustrated in the example of FIG. 2. With reference to the preceding figures and associated descriptions, the machine readable instructions 800 of FIG. 8 begin execution at block 805 at which service invoker 225 of the client 115 intercepts, from the client application 220, a cloud service call for a cloud service identified in the call, as described above. At block 810, the service invoker 225 requests listener information for the identified cloud service from the registry server 135, as described above. At block 815, the service invoker 225 receives, from the registry server 135, the requested listener information identifying the listener(s) registered as being able to process service requests for the identified cloud service. At block 820, the service invoker 225 processes the received listener information, as described above, to select a listener, and then sends service request(s) for the cloud service identifies at block 805 to the selected listener. At block 825, the service invoker 225 receives, from the selected listener, response(s) to the service request(s) sent at block 820, as described above.

Figure 9:
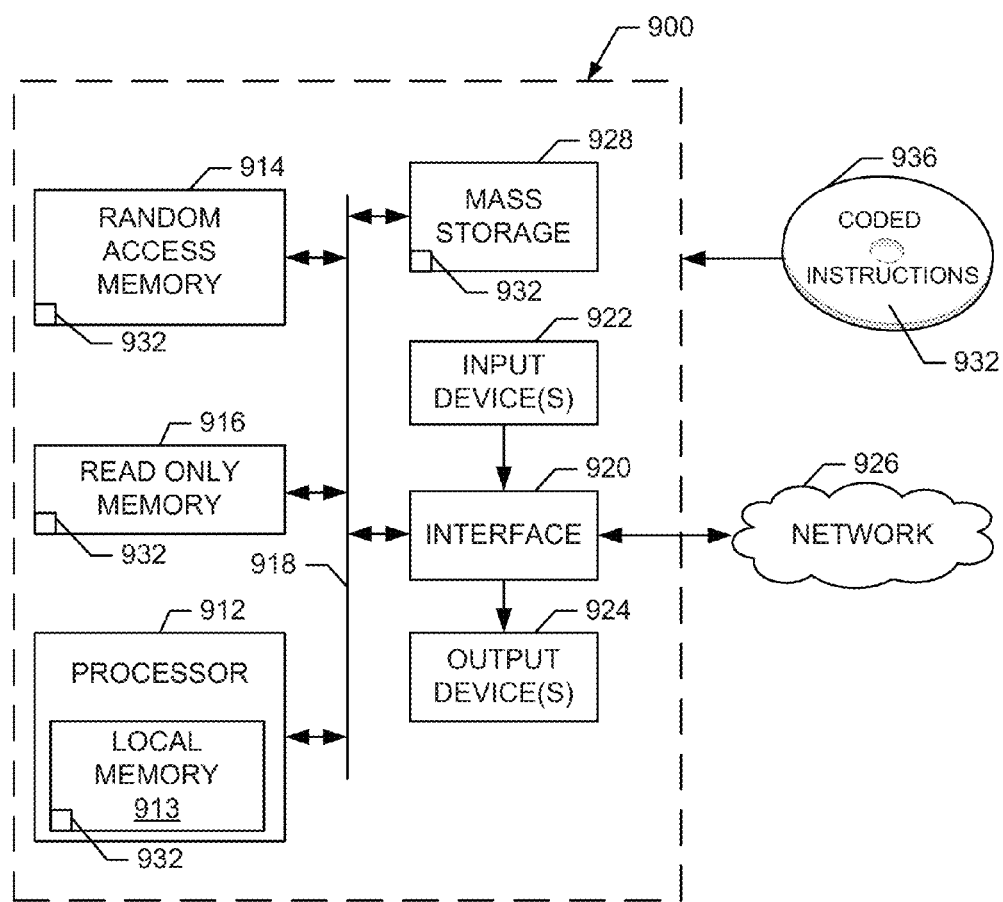
FIG. 9 is a block diagram of an example processing system that may execute the example machine readable instructions of FIGS. 4-7 and/or 8 to implement the example registry server of FIGS. 1-3, the example cloud server and/or client(s) of FIGS. 1-2, and/or the example cloud computing environment of FIG. 1.

FIG. 9 is a block diagram of an example processing system 900 capable of executing the instructions of FIGS. 4-8 to implement the example cloud computing environment 100, the example cloud site 105, the example cloud server(s) 110, the example clients 115-125, the example network 130, the example registry server 135, the example server application 205, the example listener allocator 210, the example listener 215, the example client application 220, the example service invoker 225, the example listener registrar 305, the example listener repository 310, the example listener provisioner 315 and/or the example registration updater 320 of FIGS. 1-3. The processing system 900 can be, for example, a server, a personal computer, a mobile phone (e.g., a smartphone, a cell phone, etc.), a personal digital assistant (PDA), an Internet appliance, a DVD player, a CD player, a digital video recorder, a Blu-ray player, a gaming console, a personal video recorder, a set top box, a digital camera, or any other type of computing device.

The system 900 of the instant example includes a processor 912. For example, the processor 912 can be implemented by one or more microprocessors and/or controllers from any desired family or manufacturer.

The processor 912 includes a local memory 913 (e.g., a cache) and is in communication with a main memory including a volatile memory 914 and a non-volatile memory 916 via a bus 918. The volatile memory 914 may be implemented by Static Random Access Memory (SRAM), Synchronous Dynamic Random Access Memory (SDRAM), Dynamic Random Access Memory (DRAM), RAMBUS Dynamic Random Access Memory (RDRAM) and/or any other type of random access memory device. The non-volatile memory 916 may be implemented by flash memory and/or any other desired type of memory device. Access to the main memory 914, 916 is controlled by a memory controller.

The processing system 900 also includes an interface circuit 920. The interface circuit 920 may be implemented by any type of interface standard, such as an Ethernet interface, a universal serial bus (USB), and/or a PCI express interface.

One or more input devices 922 are connected to the interface circuit 920. The input device(s) 922 permit a user to enter data and commands into the processor 912. The input device(s) can be implemented by, for example, a keyboard, a mouse, a touchscreen, a track-pad, a trackball, a trackbar (such as an isopoint), a voice recognition system and/or any other human-machine interface.

One or more output devices 924 are also connected to the interface circuit 920. The output devices 924 can be implemented, for example, by display devices (e.g., a liquid crystal display, a cathode ray tube display (CRT)), a printer and/or speakers. The interface circuit 920, thus, typically includes a graphics driver card.

The interface circuit 920 also includes a communication device, such as a modem or network interface card, to facilitate exchange of data with external computers via a network 926 (e.g., an Ethernet connection, a digital subscriber line (DSL), a telephone line, coaxial cable, a cellular telephone system, etc.).

The processing system 900 also includes one or more mass storage devices 928 for storing machine readable instructions and data. Examples of such mass storage devices 928 include floppy disk drives, hard drive disks, compact disk drives and digital versatile disk (DVD) drives. In some examples, the mass storage device 928 may implement the listener repository 310. Additionally or alternatively, in some examples the volatile memory 914 may implement the listener repository 310.

Coded instructions 932 corresponding to the instructions of FIGS. 4-8 may be stored in the mass storage device 928, in the volatile memory 914, in the non-volatile memory 916, in the local memory 913 and/or on a removable storage medium, such as a CD or DVD 936.

At least some of the above described example methods and/or apparatus are implemented by one or more software and/or firmware programs running on a computer processor. However, dedicated hardware implementations including, but not limited to, application specific integrated circuits, programmable logic arrays and other hardware devices can likewise be constructed to implement some or all of the example methods and/or apparatus described herein, either in whole or in part. Furthermore, alternative software implementations including, but not limited to, distributed processing or component/object distributed processing, parallel processing, or virtual machine processing can also be constructed to implement the example methods and/or apparatus described herein.

To the extent the above specification describes example components and functions with reference to particular standards and protocols, it is understood that the scope of this patent is not limited to such standards and protocols. For instance, each of the standards for Internet and other packet switched network transmission (e.g., Transmission Control Protocol (TCP)/Internet Protocol (IP), User Datagram Protocol (UDP)/IP, HyperText Markup Language (HTML), HyperText Transfer Protocol (HTTP)) represent examples of the current state of the art. Such standards are periodically superseded by faster or more efficient equivalents having the same general functionality. Accordingly, replacement standards and protocols having the same functions are equivalents which are contemplated by this patent and are intended to be included within the scope of the accompanying claims.

Additionally, although this patent discloses example systems including software or firmware executed on hardware, it should be noted that such systems are merely illustrative and should not be considered as limiting. For example, it is contemplated that any or all of these hardware and software components could be embodied exclusively in hardware, exclusively in software, exclusively in firmware or in some combination of hardware, firmware and/or software. Accordingly, while the above specification described example systems, methods and articles of manufacture, the examples are not the only way to implement such systems, methods and articles of manufacture. Therefore, although certain example methods, apparatus and articles of manufacture have been described herein, the scope of coverage of this patent is not limited thereto. On the contrary, this patent covers all methods, apparatus and articles of manufacture fairly falling within the scope of the claims either literally or under the doctrine of equivalents.

What is claimed is:

1. A method for cloud service listener registration, the method comprising:
   receiving, at a registry server, first information corresponding to a first listener resource associated with a cloud service implemented by a cloud server;
   registering, by the registry server using the first information corresponding to the first listener resource, the first listener resource as being available for processing client requests associated with the cloud service;
   after registering the first listener resource, receiving, at the registry server, second information corresponding to a second listener resource associated with the cloud service implemented by the cloud server;
   determining, by the registry server, whether the first information corresponding to the first listener resource associated with the cloud service should be updated based on receipt of the second information corresponding to the second listener resource associated with the cloud service; and
   in response to determining that the first information corresponding to the first listener resource associated with the cloud service should be updated based on receipt of the second information corresponding to the second listener resource associated with the cloud service,
      registering, by the registry server using the second information corresponding to the second listener resource, the second listener resource as being available for processing the client requests associated with the cloud service, and
      deregistering, by the registry server, the first listener resource.

2. The method of claim 1, wherein the first information corresponding to the first listener resource associated with the cloud service comprises:
   a name of the cloud service,
   first address information identifying a host device implementing the first listener resource, and
   second address information identifying a port of the host device allocated for use in communicating with the first listener resource, and wherein the method further comprises storing the first information corresponding to the first listener resource to register the first listener resource as being available for processing the client requests associated with the cloud service.

3. The method of claim 1, further comprising receiving, at the registry server from a client, a request to provide listener resource information associated with the cloud service, the request comprising a message including a name of the cloud service.

4. The method of claim 1, wherein determining whether the first information corresponding to the first listener resource associated with the cloud service should be updated based on receipt of the second information corresponding to the second listener resource associated with the cloud service comprises determining whether registration of the second listener resource would exceed a maximum number of listener resources allowed to be registered for the cloud service.

5. The method of claim 4, wherein registering the second listener resource as being available for processing the client requests associated with the cloud service and deregistering the first listener resource occur in response to determining that registration of the second listener resource would exceed the maximum number of listener resources allowed to be registered for the cloud service.

6. The method of claim 1, wherein the first listener resource is implemented by the cloud server implementing the cloud service.

7. A tangible machine readable storage medium comprising machine readable instructions which, when executed, cause a registry server comprising a processor to perform operations comprising:
    receiving first information corresponding to a first listener resource associated with a cloud service implemented by a cloud server;
    registering, using the first information corresponding to the first listener resource, the first listener resource as being available for processing client requests associated with the cloud service;
    after registering the first listener resource, receiving second information corresponding to a second listener resource associated with the cloud service implemented by the cloud server;
    determining whether the first information corresponding to the first listener resource associated with the cloud service should be updated based on receipt of the second information corresponding to the second listener resource associated with the cloud service; and
    in response to determining that the first information corresponding to the first listener resource associated with the cloud service should be updated based on receipt of the second information corresponding to the second listener resource associated with the cloud service,
        registering, using the second information corresponding to the second listener resource, the second listener resource as being available for processing the client requests associated with the cloud service, and
        deregistering the first listener resource.

8. The tangible machine readable storage medium of claim 7, wherein the first information corresponding to the first listener resource associated with the cloud service comprises:
    a name of the cloud service,
    first address information identifying a host device implementing the first listener resource, and
    second address information identifying a port of the host device allocated for use in communicating with the first listener resource, and wherein the operations further comprise storing the first information corresponding to the first listener resource to register the first listener resource as being available for processing the client requests associated with the cloud service.

9. The tangible machine readable storage medium of claim 7, wherein the operations further comprise receiving, from a client, a request to provide listener resource information associated with the cloud service, the request comprising a message including a name of the cloud service.

10. The tangible machine readable storage medium of claim 7, wherein determining whether the first information corresponding to the first listener resource associated with the cloud service should be updated based on receipt of the second information corresponding to the second listener resource associated with the cloud service comprises determining whether registration of the second listener resource would exceed a maximum number of listener resources allowed to be registered for the cloud service.

11. The tangible machine readable storage medium of claim 10, wherein registering the second listener resource as being available for processing the client requests associated with the cloud service and deregistering the first listener resource occur in response to determining that registration of the second listener resource would exceed the maximum number of listener resources allowed to be registered for the cloud service.

12. The tangible machine readable storage medium of claim 7, wherein the first listener resource is implemented by the cloud server implementing the cloud service.

13. A registry server to perform cloud service listener registration, the registry server comprising:
    a memory having machine readable instructions stored thereon; and
    a processor to execute the machine readable instructions to perform operations comprising:
        receiving first information corresponding to a first listener resource associated with a cloud service implemented by a cloud server,
        registering, the first information corresponding to the first listener resource, the first listener resource as being available for processing client requests associated with the cloud service,
        after registering the first listener resource, receiving second information corresponding to a second listener resource associated with the cloud service implemented by the cloud server,
        determining whether the first information corresponding to the first listener resource associated with the cloud service should be updated based on receipt of the second information corresponding to the second listener resource associated with the cloud service, and
        in response to determining that the first information corresponding to the first listener resource associated with the cloud service should be updated based on receipt of the second information corresponding to the second listener resource associated with the cloud service,
            registering, using the second information corresponding to the second listener resource, the second listener resource as being available for processing the client requests associated with the cloud service, and
            deregistering the first listener resource.

14. The registry server of claim 13, wherein the first information corresponding to the first listener resource associated with the cloud service comprises
    a name of the cloud service,
    first address information identifying a host device implementing the first listener resource, and
    second address information identifying a port of the host device allocated for use in communicating with the first listener resource, and wherein the operations further comprise storing the first information to register the first listener resource as being available for processing the client requests associated with the cloud service.

15. The registry server of claim 13, wherein determining whether the first information corresponding to the first listener resource associated with the cloud service should be updated based on receipt of the second information corresponding to the second listener resource associated with the cloud service comprises determining whether registration of the second listener resource would exceed a maximum number of listener resources allowed to be registered for the cloud service.

16. The registry server of claim 15, wherein registering the second listener resource as being available for processing the client requests associated with the cloud service and deregistering the first listener resource occur in response to determining that registration of the second listener resource would exceed the maximum number of listener resources allowed to be registered for the cloud service.

17. The registry server of claim 13, wherein the first listener resource is implemented by the cloud server implementing the cloud service.

* * * * *